(12) United States Patent
Münch et al.

(10) Patent No.: US 11,204,277 B2
(45) Date of Patent: Dec. 21, 2021

(54) SPECTROMETER ARRANGEMENT

(71) Applicant: Analytik Jena AG, Jena (DE)

(72) Inventors: Stefan Münch, Berlin (DE); Michael Okruss, Potsdam (DE); Marco Braun, Jena (DE)

(73) Assignee: Analytik Jena GmbH, Jena (DE)

( * ) Notice: Subject to any disclaimer, the term of this patent is extended or adjusted under 35 U.S.C. 154(b) by 0 days.

(21) Appl. No.: 16/880,334

(22) Filed: May 21, 2020

(65) Prior Publication Data
US 2020/0370957 A1 Nov. 26, 2020

(30) Foreign Application Priority Data
May 21, 2019 (DE) .................. 10 2019 113 478.1

(51) Int. Cl.
*G01J 3/10* (2006.01)
*G01J 3/18* (2006.01)
(Continued)

(52) U.S. Cl.
CPC ........... *G01J 3/1809* (2013.01); *G01J 3/0208* (2013.01); *G01J 3/10* (2013.01); *G01J 3/2803* (2013.01); *G01J 3/2823* (2013.01)

(58) Field of Classification Search
CPC .......... G01J 3/1809; G01J 3/10; G01J 3/2803; G01J 3/2823; G01N 21/73
See application file for complete search history.

(56) References Cited

U.S. PATENT DOCUMENTS 5,973,780 A     10/1999 Tsuboi et al.
2007/0230871 A1* 10/2007 Bidnyk ............. G02B 6/12007
                                              385/37
(Continued)

FOREIGN PATENT DOCUMENTS

DE      10207742 A1    9/2003
DE   102016124980 A1   8/2017

OTHER PUBLICATIONS

Shaojie Chen, "A new type of wide spectral coverage echelle spectrometer design for ICPAES", 2012 hereafter Chen (Year: 2012).*

(Continued)

*Primary Examiner* — Maurice C Smith
(74) *Attorney, Agent, or Firm* — Kelly J. Smith; Endress+Hauser (USA) Holding Inc.

(57) ABSTRACT

The present disclosure relates to a spectrometer arrangement for analyzing optical radiation from a light source comprising an echelle grating for dispersion of the radiation entering the spectrometer arrangement in a main dispersion direction, a dispersion element for dispersing the radiation in a cross-dispersion direction, the main dispersion direction and the cross-dispersion direction having a predeterminable angle to each other, and a detector unit for acquiring a first spectrum of a first part of the radiation comprising a first predeterminable wavelength range. According to the present disclosure, the spectrometer arrangement comprises a first optical element, which is arranged or configured in such a way that a second spectrum of a second part of the radiation comprising a second predeterminable wavelength range differing from the first can be acquired by means of the detector unit.

15 Claims, 5 Drawing Sheets

(51) Int. Cl.
  *G01J 3/28* (2006.01)
  *G01J 3/02* (2006.01)

(56) References Cited

U.S. PATENT DOCUMENTS

| | | | |
|---|---|---|---|
| 2008/0094626 A1* | 4/2008 | Becker-Ross | G01J 3/12 356/328 |
| 2010/0171953 A1* | 7/2010 | Becker-Ross | G01J 3/1809 356/328 |

OTHER PUBLICATIONS

Daniel Thomae, "Compact echelle spectrometer employing across-grating", Aug. 22, 2018 (Year: 2018).*
R.B. Bilhorn, "Elemental Analysis with a Plasma Emission Echelle Spectrometer Employing a Charge Injection Device (CID) Detector", 1989 (Year: 1989).*

* cited by examiner

SPECTROMETER ARRANGEMENT

CROSS-REFERENCE TO RELATED APPLICATION

The present application is related to and claims the priority benefit of German Patent Application No. 10 2019 113 478.1, filed on May 21, 2019, the entire contents of which are incorporated herein by reference.

TECHNICAL FIELD

The present disclosure relates to a spectrometer arrangement for analyzing optical radiation from a light source comprising an echelle grating.

BACKGROUND

Spectrometer arrangements with an echelle grating have become known from the prior art in the most varied developments. In an echelle spectrometer, gratings having a ladder-like cross-section are used (echelle being the French word for "ladder"). Illumination of the short facets of the step-like structure at a predeterminable blaze angle generates a diffraction pattern, which concentrates the diffracted intensity in high diffraction orders, for example, in the fiftieth to one-hundredth orders. High spectral resolutions can thereby be achieved with a compact arrangement. The orders can however overlap, depending on the incident wavelengths.

For example, spectrometers with internal and external order separation have become known from the prior art. In the case of echelle spectrometers with external order separation, for example spectrometers with a very long slit, only radiation from a comparatively small spectral range usually enters the spectrometer.

On the other hand, in the case of spectrometers with internal order separation, in addition to the dispersion caused by the echelle grating, the radiation is again dispersed transversely to the dispersion direction of the echelle grating, in order to separate from each other the various orders that occur. A two-dimensional spectrum of spectral sections essentially arranged parallel to each other is then obtained. The free spectral ranges of the respective diffraction orders together yield a gap-free spectrum for a particular wavelength range. Planar detectors, in particular planar detectors with a multiplicity of detector elements, which enable simultaneous detection of a wavelength range of interest with high spectral resolution, are suitable for detecting the spectra.

Typically, cross-dispersion is selected at such a large level that the orders are completely separated throughout. In order to ensure this over the entire spectral range, there are spectral ranges in which an unused interspace arises between the individual orders. If a prism is used for cross-dispersion, larger interspaces, for example, will arise in the short-wave spectral range than in the longer-wave spectral range, this being due to the greater dispersion.

A disadvantage with the known arrangements is that the detectors generally have to be very large in order to be able to detect larger spectral regions at a high resolution and with sufficient light conductivity. In atomic absorption spectroscopy and also in many other spectroscopic detection methods, the detection limit depends, among other things, on the light conductivity and the sensitivity of the arrangement used. The spectral resolution of the arrangement used in turn depends among other things on the slit width, the dimensions of the detector elements in the main dispersion direction and the imaging quality. In principle, it is desirable that a high spectral resolution with a simultaneously high light conductivity be obtained.

In the detection of high-resolution wide-range spectra with echelle spectrometers, there is frequently a problem in that the spectral measurement range desired in each case cannot be detected at the required spectral resolution and/or the required light conductivity. The utilization of the available detector surface is in principle restricted by the necessary spatial separation of the diffraction orders, the reduction of the free spectral range with decreasing wavelength and the variability of the distances between orders. The last-mentioned influence is particularly strong in the case of measuring ranges which extend as far as wavelengths<200 nm.

In order to address this problem, it is possible, for example, to enlarge the detector surface according to the desired wavelength range. However, this is bound up with a significantly higher cost. Moreover, due to the enlarged image field relative to the focal length, larger detector surfaces can have a negative impact on the imaging quality.

A further possibility consists of the use of detectors with smaller pixels. However, in order to be able to profit here from the greater number of available channels, the slit width and/or the slit height must be reduced, which disadvantageously leads to a reduction in the light conductivity.

For this reason, in the acquisition of high-resolution wide-range spectra with echelle spectrometers, the simultaneously detectable spectral range is frequently limited in order to enable fulfillment of the respective requirements regarding spectral resolution and/or light conductivity. Relevant wavelengths lying outside the selected spectral range are then detected via a separate spectrometer channel or sequentially by changing the orientation of individual components of the spectrometer arrangement.

For example, DE102009059280A1 discloses a spectrometer with which individual subranges of the desired spectral range are detected sequentially. By rotating the prism used, the simultaneously detectable subrange is continuously adjusted. Disadvantageously, however, the orientation of individual optical elements of the arrangement must be changed continuously during operation. This leads to a significant increase in mechanical complexity and to increased demands on the operating and evaluation software of the spectrometer. For example, a new wavelength referencing operation must be carried out each time the spectral range is reset. In addition, the method is fundamentally unsuitable for application areas in which simultaneous detection of the entire desired wavelength range is necessary, such as for example various applications in process analysis using LIBS (laser-induced breakdown spectroscopy) technology or spark spectroscopy.

From the article "Design and evaluation of an echelle grating optical system for ICP OES" by T. W. Bernard et al., Analytical Chemistry, 1993, 65(9), pp. 1125-1230, an echelle spectrometer with two spectrometer channels has on the other hand become known, through which different subregions of the desired spectral range are in each case routed. Each channel has its own imaging optics and its own detector system. An annular Schmidt plate with an impressed grating is used as the separating optical element.

WO2005/121723A1 has in turn disclosed an arrangement with which the entire desired spectral range is detected sequentially via two channels, wherein the two channels are separately optimized with regard to light throughput and resolution. The spectra of both channels are detected by the same detector system.

Another possible approach in the simultaneous acquisition of wide-range spectra consists of an improvement in the utilization of the detector surface by harmonizing the distances between the diffraction orders. For this purpose, U.S. Pat. No. 8,681,329B2 discloses the use of an upstream grating spectrometer. In contrast, DE69518244T2 achieves this object by combining a plurality of prisms with different dispersion properties.

SUMMARY

The present disclosure is based on the object or enabling the simultaneous detection of wide-range spectra in a particularly simple manner.

This object is achieved by the spectrometer arrangement for analyzing optical radiation from a light source. The spectrometer arrangement comprises an echelle grating for dispersion of the radiation entering the spectrometer arrangement in a main dispersion direction, a dispersion element for dispersion of the radiation in a cross-dispersion direction, wherein the main dispersion direction and the cross-dispersion direction has a predeterminable angle to each other, and a detector unit for recording a first spectrum of a first part of the radiation comprising a first predeterminable wavelength range.

According to the present disclosure, the spectrometer arrangement further comprises a first optical element, which is arranged and/or configured in such a way that a second spectrum of a second part of the radiation comprising a second predeterminable wavelength range differing from the first can be acquired by means of the detector unit.

Accordingly, a first part of the radiation corresponding to a first wavelength range, or even the main spectral range, is regularly imaged onto the detector unit by the radiation entering the spectrometer arrangement. The detector unit and/or at least one further component of the spectrometer arrangement are arranged and/or configured in such a way that only a part of the incoming radiation reaches the detector unit. The wavelength range of the incoming radiation is thus appropriately limited in the form of the first part of the radiation, in such a way that the requirements regarding resolution and/or light conductivity can be satisfied.

A second part, however, regularly does not reach the detector unit. However, this second part of the radiation, which is also relevant for the respective analysis, does not reach the detector unit without further means being used. In order nevertheless to be able to detect this second part, the first optical element is used according to the present disclosure. The first optical element ensures that a further spectral subrange, the second part of the radiation, can likewise be analyzed.

Advantageously, the effective light conductivity of the spectrometer arrangement is not or is hardly influenced by the use of a first optical element for widening the spectral range. In fact, additional reflection losses can be effectively avoided.

In a first development of the present disclosure, the first optical element is a lens, a prism, in particular one reflecting on one side, or a mirror, in particular a deflection mirror. In the case of a mirror, the mirror can have both a planar and a curved surface or also a surface in the form of a freeform surface. A prism, such as one reflecting on one side, preferably on the rear face, is in turn particularly advantageous for matching the order spacings of the two wavelength ranges.

In a further development, the spectrometer arrangement comprises a second optical element, which serves to guide the first part of the radiation to the detector unit. The second optical element includes a mirror, in particular a deflection mirror, which can likewise have a planar or curved or freeform surface. In particular, the second optical element is arranged upstream of the detector unit.

Depending on the arrangement and/or development of the optical elements, in particular of the first optical element and/or the second optical element, and/or the detector unit, the first and/or the second wavelength ranges can each have an unbroken wavelength range or have gaps. In particular, a total wavelength range comprising the first and second wavelength ranges may have gaps, since as a rule not all the entire free spectral range of all diffraction orders is detected by the detector unit.

It is advantageous if the first optical element is arranged next to the second optical element and/or at a predeterminable angle to the second optical element. Arranging the two optical elements next to each other ensures that both parts of the radiation pass through the same number of optical elements.

It is also advantageous if the predeterminable angle and/or a position of the first optical element, such as relative to the second optical element, is/are selected as a function of the second wavelength range of the second part of the radiation. In principle, it is advantageous to set the predeterminable angle and/or the position of the first optical element in such a way that the wavelengths of the second wavelength range are deflected by a predeterminable angular value relative to the wavelengths of the first wavelength range. In this way, the second predeterminable wavelength range can be selected in a targeted or suitable manner for the application in question. For example, in the case of a development of both optical elements as mirrors, the necessary predeterminable angle increases with increasing spectral distance from the first part of the radiation.

In a further development, the spectrometer arrangement comprises an imaging optical system, which is designed to image at least the first part of the radiation into an image plane in which image plane the detector unit is arranged. As a rule, while the first part of the radiation reaches the detector unit, the second part of the radiation does not reach the detector unit without the first optical element being used. The first and optionally the second optical element are preferably arranged between the imaging optical component and the detector unit.

It is thus advantageous if the first optical element is arranged and/or configured in such a way that the first part of the radiation and the second part of the radiation are imaged into one image plane. The first optical element thus ensures that the second part of the radiation is imaged into the same image plane into which the first part of the radiation is imaged and in which the detector unit is located.

In an exemplary development, the spectrometer arrangement is designed to receive alternately the first and second spectra of the first and the second parts of the radiation. In particular, the two spectra are recorded sequentially, or either the first or the second spectrum can be acquired as required.

In this respect, it is advantageous if the spectrometer arrangement comprises a movable, diaphragm unit, which is designed to at least temporarily occlude at least a part of the first part of the radiation or at least a part of the second part of the radiation. For example, the diaphragm unit can be designed such that it temporarily covers the first or the second optical element.

Another embodiment of a development includes the spectrometer arrangement being designed to simultaneously detect the first and second spectra of the first and the second parts of the radiation by means of the detector unit. In this respect, different variants are possible, some of which are given below.

On the one hand, it is possible for the spectrometer arrangement to be designed to detect the first and the second spectra in different subranges of the detector unit. The spectra of the first and the second parts of the radiation are thus imaged into different subranges of the detector unit.

However, it is also possible for the spectrometer arrangement to be designed to superimpose the first and the second spectra onto each other. In this case, both spectra are detected together by the detector unit.

In this respect, the spectrometer arrangement is designed to receive the first and the second spectra in such a way that the second spectrum lies between at least two different diffraction orders of the first spectrum. The orders of the first part of the radiation are ideally completely separated from each other. Depending on the dispersing element used, interspaces exist between the different orders. The spectrum of the second part of the radiation can be imaged, for example, into these interspaces.

It is also advantageous if at least one parameter, such as a line count or a blaze angle, of the echelle grating and/or at least one parameter of the dispersing element, in particular of the cross-dispersing element, is/are selected in such a way that the second spectrum is arranged between at least two different diffraction orders of the first spectrum. In the case in which a prism is selected as the dispersing element, the main spectral range can be expanded in particular in a simple manner by the addition of a short-wave second wavelength range.

A further development of the spectrometer arrangement includes the first and/or second optical element being arranged at a location in the beam path of the radiation at which the first part of the radiation and the second part of the radiation essentially do not or only slightly overlap. The first and/or second optical elements are arranged close to the detector unit.

The spectrometer arrangement described can be used, for example, in atomic absorption spectroscopy (AAS). A radiation source with a continuous spectrum in a wavelength range between 190 nm and 860 nm, in particular a Xe high-pressure short-arc lamp, can then, for example, be considered as the light source. However, the spectrometer arrangement according to the present disclosure is likewise suitable for optical emission spectroscopy (ICP-OES) and can in this case have an inductively coupled plasma (ICP).

In summary, the present disclosure makes it possible to improve the simultaneously detectable spectral range in a particularly simple manner and in particular without high optical and/or mechanical complexity. In particular, an expansion of the spectral range is achieved without any moving optical elements. Furthermore, the light conductivity is advantageously not or only slightly influenced by the first optical element.

BRIEF DESCRIPTION OF THE DRAWINGS

The present disclosure is explained in greater detail with reference to the following figures. The following are shown.

DETAILED DESCRIPTION

In the figures, identical elements are in each case provided with the same reference symbols.

Figure 1:
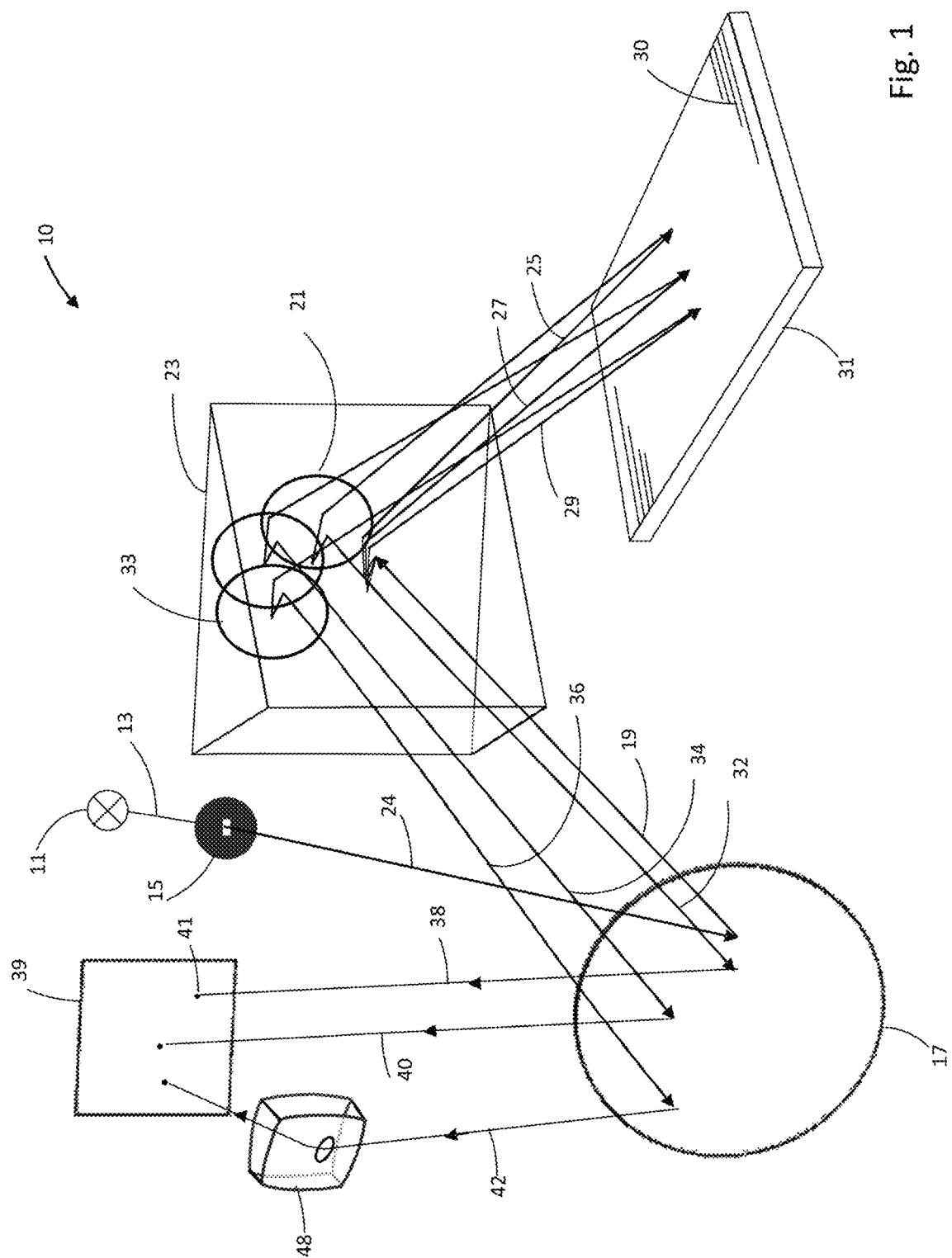
FIG. 1 shows a spectrometer arrangement according to the present disclosure with a first optical element in the form of a refractive element.

FIG. 1 is a schematic representation of a spectrometer arrangement 10 according to the present disclosure. Without restricting generality, it is an echelle spectrometer with internal separation of orders.

The optical radiation 13 from a light source 11 is routed in focused form onto the entry slit 15 from where it enters the actual spectrometer.

Thereby, the incoming light 14 comprises radiation of all wavelengths emitted by the light source 11. The light source is, for example, a xenon short-arc high-pressure lamp or a deuterium emitter, such as that frequently used in atomic absorption spectroscopy. Alternatively, radiation from an emission source, for example an inductively coupled plasma source (ICP), can be imaged onto the entry slit 15. Depending on the application, lasers, hollow cathode lamps, mercury vapor lamps and the like can also be used as the light source 11.

The incident light beams are parallelized (19) by a collimating imaging optical component 17, which may be, for example, a concave mirror. The collimated light subsequently strikes the prism 21, which functions as an optical order-separation unit. The rear face 23 of the prism 21 is mirror-coated. In the plane of illustration, the roof edge 22 of the prism 21 runs essentially perpendicularly.

The radiation predispersed by the prism 21, by way of example represented here by the wavelengths $\lambda 1$ (25), $\lambda 2$ (27) and $\lambda 3$ (29), arrives at the main dispersion element that has the form of an echelle grating 31. The grating lines of the echelle grating 31 are indicated by lines 30. The radiation is diffracted by the echelle grating 31 into a plurality of diffraction orders with high order numbers. However, at the grating the orders are still heavily spatially superimposed. In the Littrow arrangement shown here by way of example, the beams therefore pass from the echelle grating 31 once more to the retroreflecting prism 21, where the different wavelengths are dispersed once again transversely to the main dispersion direction. At the rear face of the prism 21 the beams of the different wavelengths $\lambda 1$, $\lambda 2$ and $\lambda 3$ in the example are considerably superimposed 33 due to the comparatively large beam diameters. Therefore, the relative beam overlap is large.

From the prism 21, the beams are routed back to the imaging optical component 17, which serves to image the beams onto the detector 39. Only those wavelengths that belong to a first predeterminable wavelength range, the main spectral measuring range (here: 38 and 40), arrive in this way at the detector unit 39 by means of which a first spectrum of the first part of the radiation (38 and 40) can be generated.

According to the present disclosure, a first optical element 48 is also provided, by means of which a second part of the radiation (here: 42) can be routed to the detector unit 39, which second part would not be detectable without the first optical element 48. In this way, wavelengths or wavelength ranges which do not belong to the main measuring ranges (38 and 40) can also be detected according to the present disclosure. Thereby, the first optical element 48 is designed and arranged in such a way that the second part of the radiation 42 is also guided to the detector unit 39. The first part 38, 40 and the second part 42 of the radiation then lie at least partially essentially in one image plane, or an angle between the two image planes is smaller than a predeterminable limit value. In particular, the second wavelength range is selected as a function of the achievable angle between the two image planes.

For the development shown by way of example in FIG. 1, the first optical element 48 is a prism, which is arranged between the imaging optical component 17 and the detector unit 39. The first optical element 48 produces an image of adequate image quality 41.

In addition to the above-mentioned optical components, the spectrometer arrangement 10 comprises further components such as a housing, a base plate, attachment and adjustment means, mechanical drives and electrical components for controlling the optical components and for receiving and evaluating the signals at the detector unit 39, which are not shown here for the sake of simplicity.

FIG. 2 shows two further possible developments for a spectrometer arrangement 10 according to the present disclosure. In contrast to the arrangement shown in FIG. 1, the arrangements 10 in FIG. 2 in each case additionally comprise a second optical element 35 which, by way of example, takes the form of a deflection mirror.

Figure 2A:
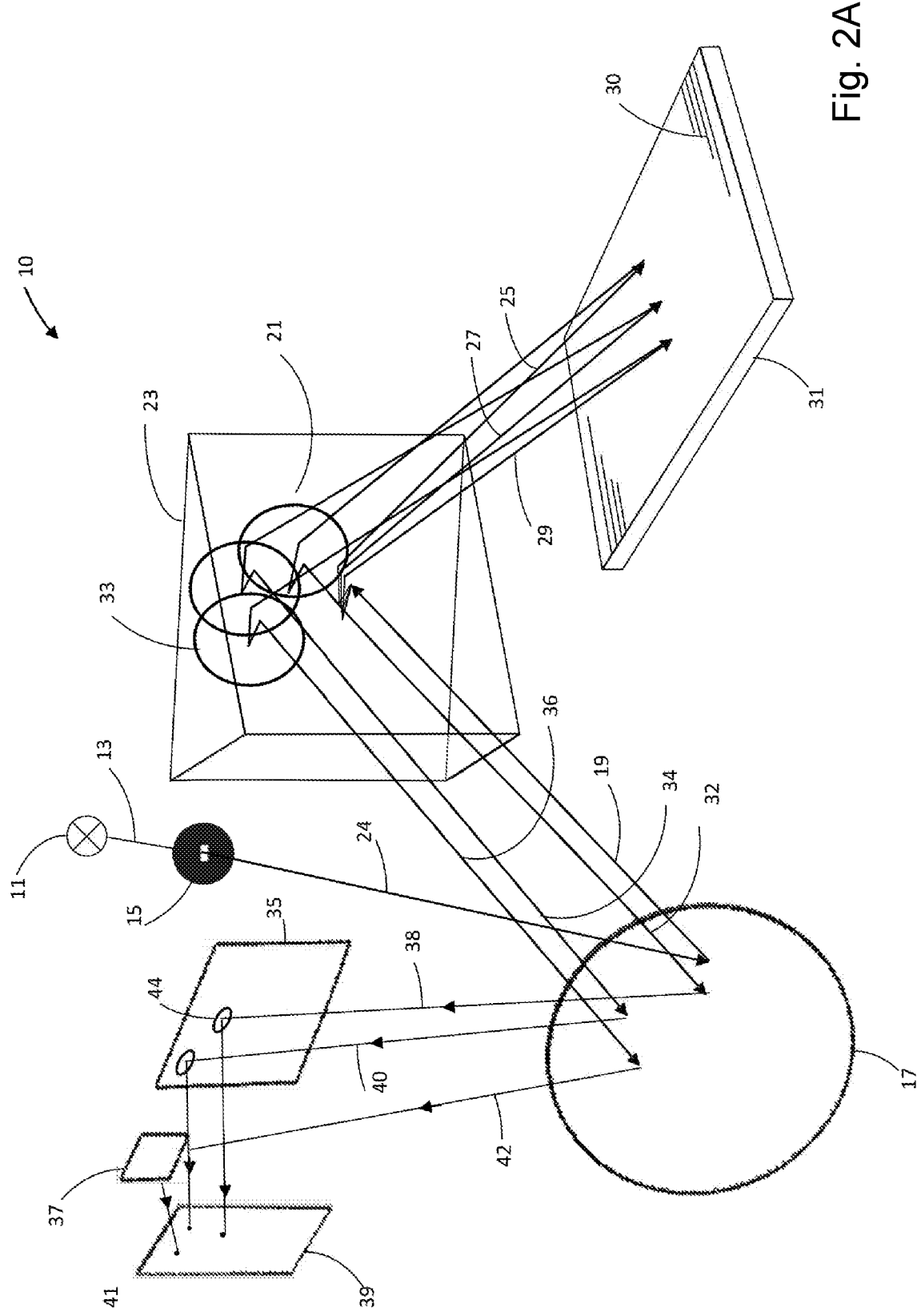
FIG. 2A shows a spectrometer according to the present day disclosure arrangement according to the present disclosure with a first optical element in the form of a deflection mirror and also with a second optical element, in the form of a mirror.

In the development according to FIG. 2a, the first optical element 37 likewise takes the form of a deflection mirror. The wavelengths 42 of the second part of the radiation are guided to the detector unit 39 via the deflection mirror 37, which is arranged laterally with respect to the second optical element 35 and at a predeterminable angle to the second optical element 35.

Figure 2B:
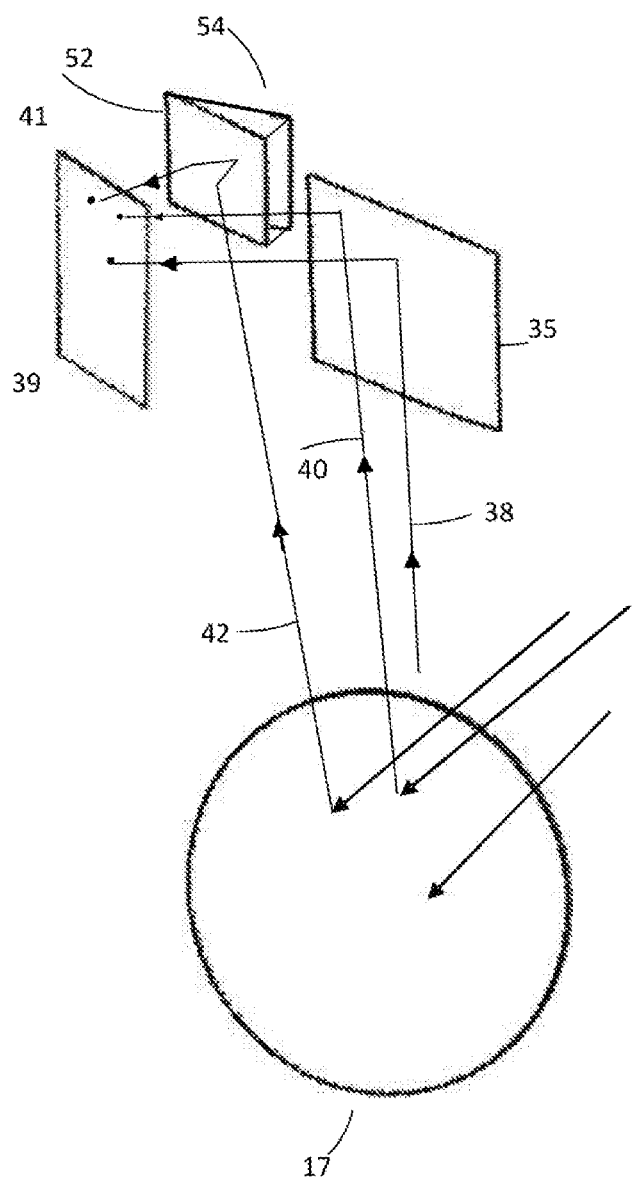
FIG. 2B shows a spectrometer according to the present disclosure with a first optical element in the form of a prism and also with a second optical element in the form of a mirror.

Even in the case in which a second optical element 35 is present, the first optical element may, as shown in FIG. 2b, also be a prism 52 which is likewise positioned laterally with respect to the second optical element 35 and which for the development shown here has a reflective rear face 54, in contrast to the variant shown in FIG. 1.

For the two variants shown, the first 48, 37, 52 and the second 35 optical elements are arranged in the vicinity of the detector unit 39. At this location, the beam diameters of the first 38, 40 and the second 42 parts of the radiation are already greatly reduced due to the beam convergence. There is therefore only very little or no beam overlap, so that no wavelengths of the two predeterminable wavelength ranges pass through the two optical elements 48, 37, 52 and 35.

By integrating the first optical element 48, 37, 52, at least individual subranges of the detector unit 39 are illuminated from two different directions. In order nevertheless to be able to evaluate both the first spectrum and the second spectrum, various possibilities are conceivable, two preferred variants of which are illustrated below.

Figure 3:
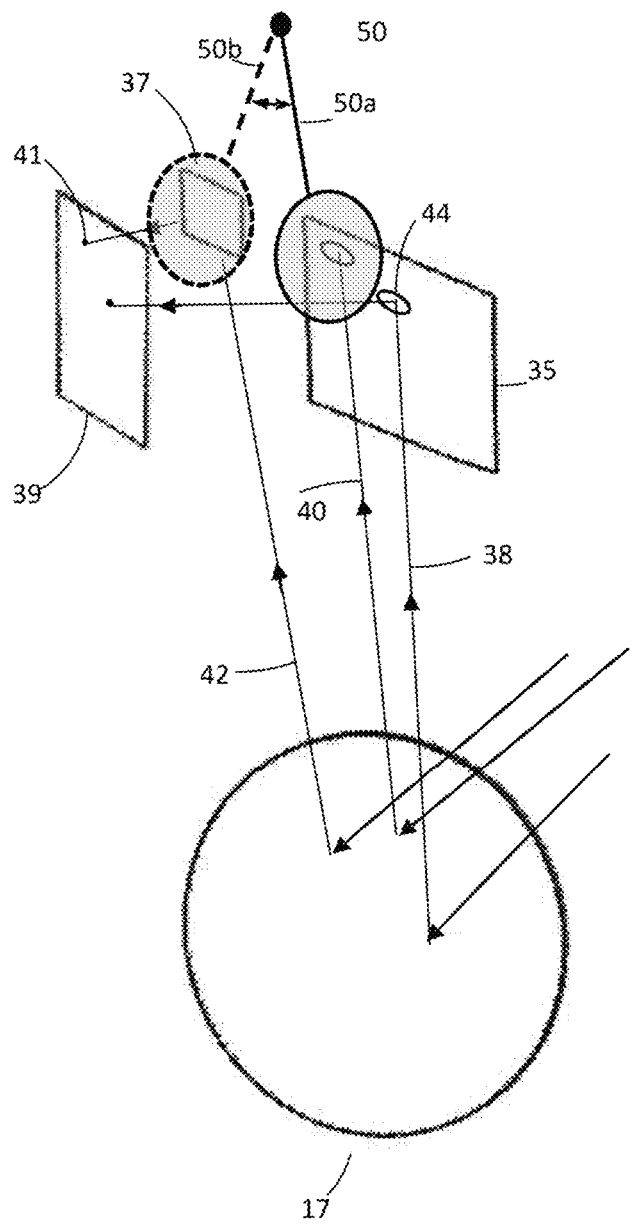
FIG. 3 shows a spectrometer arrangement according to the present disclosure for generating the first and second spectra alternately.

On the one hand, it is possible to acquire alternately the first and second spectra of the first and the second parts of the radiation. One possibility for this is shown in FIG. 3. The spectrometer arrangement 10 corresponds to the arrangement shown in FIG. 2. In addition to FIG. 2, the spectrometer arrangement has a pivotable diaphragm unit 50 by means of which the first optical element 37 or at least a part of the second optical element 35 can be at times covered. The diaphragm unit can thus be positioned in two different positions (50a and 50b) such that it is placed in front of the first optical element 37 or the second optical element 35 respectively. For the desired analysis, it is often sufficient to define a second wavelength range, which is small compared to the first wavelength range, for the second part of the radiation 42 in order to be able to analyze all desired wavelengths for a particular application. In this case, a partial covering of the second optical element 35, as is the case for the development illustrated in FIG. 3, is correspondingly sufficient.

An at least partially sequential detection of the first and second spectra offers the possibility of being able to adapt the slit geometry appropriately for the measurement in question and thus optimizing the light conductivity individually for each of the two spectra.

Figure 4:
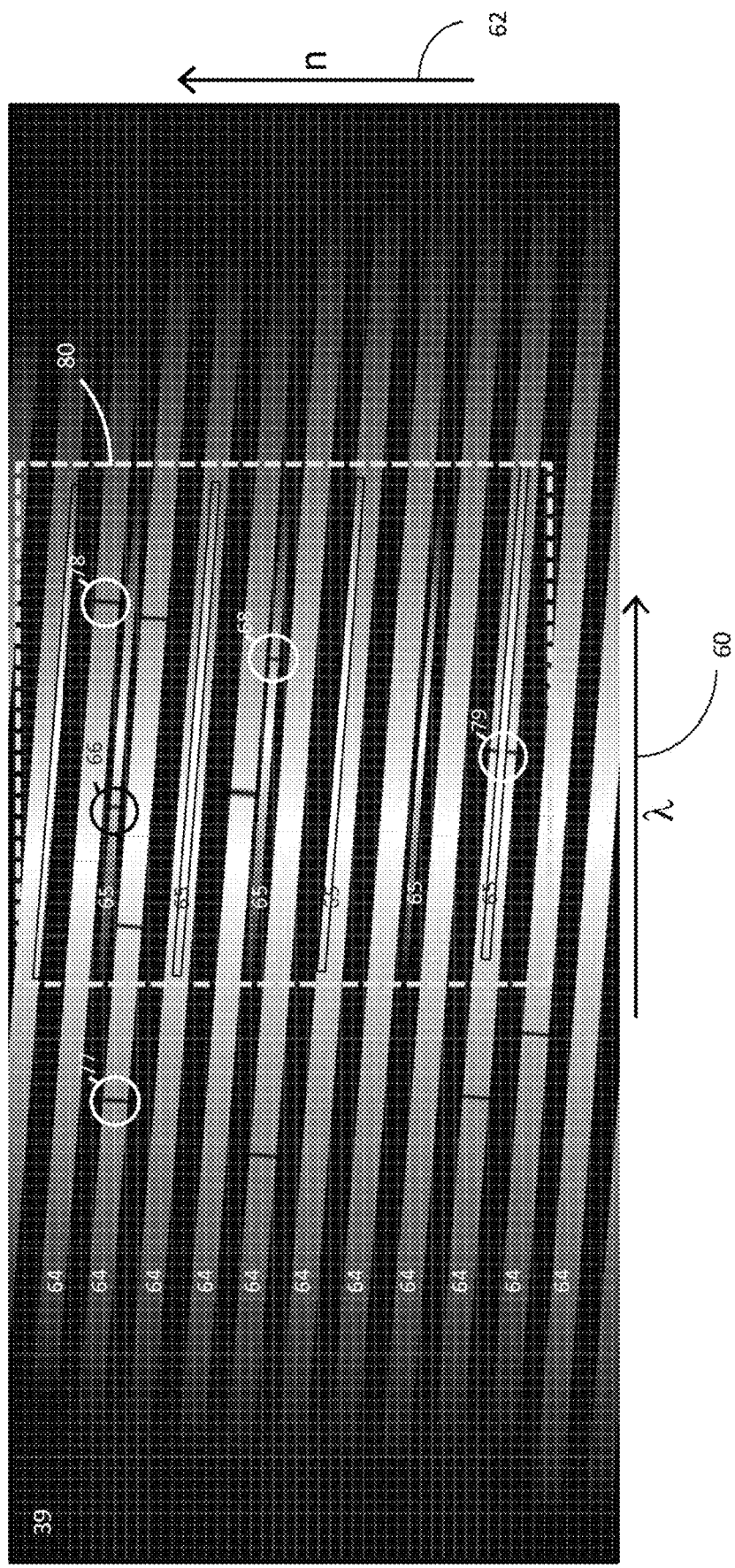
FIG. 4 shows an echellogram with first and second spectra superimposed on each other.

Alternatively, it is also possible to simultaneously detect the first and second spectra of the first part 38, 40 and the second part 42 of the radiation by means of the detector unit 39. This procedure is illustrated by way of example in FIG. 4. The two echellograms of the first part 38, 40 and second part 42 of the radiation are "folded into each other" on the detector unit 39, that is, the useful regions of the echellogram of the second part 42 of the radiation are guided onto the detector unit 39 in such a way that they lie between two different diffraction orders of the echellogram of the first part 38, 40 of the radiation.

For the example shown, as the first part 38, 40 of the radiation, a first predeterminable wavelength range having wavelengths between 230 nm and 900 nm is acquired simultaneously with a second part 42 of the radiation comprising the spectral lines of arsenic (193.696 nm) (66) and selenium (196.0267 nm) (68) and their respective closer spectral environments. Spectral lines of the first wavelength range which lie outside the spectral image of the second predeterminable wavelength range of the second part 42 of the radiation (77), those which lie within the range of the spectral image of the second predeterminable wavelength range but are measurable without interference (78), and also lines (79) disturbed by the echellogram of the second wavelength range, are shown.

Due to the increasing prism dispersion at short wavelengths, the diffraction orders of the first spectrum 64 are relatively far apart from each other. The second spectrum 65 is imaged into the resulting gaps between the orders. The orders of the first spectrum 64 are significantly thicker in the cross-dispersion direction, which is due to the astigmatic extension of the spot images in this region of the image field caused by the imaging optical component 17 (as in the preceding examples, this is a concave mirror). In contrast, the diffraction orders of the second spectrum 65 are distinctly narrower. This can be achieved by using a cylindrical deflection mirror as the first optical element 37 and the astigmatism correction associated therewith. It is thus possible that an overlap of the two spectra 64 and 65 is avoided by a suitable selection and configuration of the individual components of the arrangement 10 and at the same time a high signal-to-noise ratio achieved.

It should be pointed out that further optical elements are also implemented for detecting further parts of the radiation corresponding to further additional predeterminable wavelength ranges. The spectrometer arrangement 10 according to the present disclosure is accordingly in no way restricted to the representation of two spectra 64, 65 corresponding to two parts of the radiation 38, 40 and 42.

The invention claimed is:

1. A spectrometer arrangement for analyzing optical radiation from a light source, comprising:
   an echelle grating for dispersion of the radiation entering the spectrometer arrangement in a main dispersion direction,
   a dispersion element for dispersing the radiation in a cross-dispersion direction, wherein the main dispersion direction and the cross-dispersion direction have a predeterminable angle to each other, and
   a detector unit for recording a first spectrum of a main spectral range of a first part of the radiation comprising a first predeterminable wavelength range,
   wherein the spectrometer arrangement comprises a first optical element, which is arranged or configured in such a way that a second spectrum of a second part of the radiation comprising a second predeterminable wavelength range differing from the first and not belonging to the main spectral range can be acquired by the detector unit, which second part of the radiation would not reach the detector unit without the first optical element.

2. The spectrometer arrangement of claim 1, wherein the first optical element is a lens or a mirror.

3. The spectrometer arrangement of 2, comprising a second optical element which serves to guide the first part of the radiation to the detector unit, wherein the second optical element is a mirror.

4. The spectrometer arrangement of claim 3, wherein the first optical element is arranged next to the second optical element or at a predeterminable angle to the second optical element.

5. The spectrometer arrangement of claim 4, wherein the predeterminable angle or a position of the first optical element is selected as a function of the second wavelength range of the second part of the radiation.

6. The spectrometer arrangement of claim 1, comprising an imaging optical component, which is designed to image at least the first part of the radiation into an image plane, in which image plane the detector unit is arranged.

7. The spectrometer arrangement of claim 1, wherein the first optical element is arranged or configured in such a way that the first part of the radiation and the second part of the radiation are imaged into one image plane.

8. The spectrometer arrangement of claim 1, wherein the spectrometer arrangement is designed to receive alternately the first and second spectra of the first part and the second part of the radiation.

9. The spectrometer arrangement of claim 7, comprising a diaphragm unit, which is designed to at least temporarily occlude at least a part of the first part of the radiation or at least a part of the second part of the radiation.

10. The spectrometer arrangement of claim 1, wherein the spectrometer arrangement is designed to simultaneously detect the first and the second spectrum of the first and the second part of the radiation using the detector unit.

11. The spectrometer arrangement of claim 10, wherein the spectrometer arrangement is designed to detect the first and the second spectrum in different subranges of the detector unit.

12. The spectrometer arrangement of claim 10, wherein the spectrometer arrangement is designed to superimpose the first spectrum and the second spectrum onto each other.

13. The spectrometer arrangement of claim 12, wherein the spectrometer arrangement is designed to receive the first spectrum and the second spectrum in such a way that the second spectrum is imaged between at least two different diffraction orders of the first spectrum.

14. The spectrometer arrangement of claim 12, wherein at least one parameter, in particular a line count or a blaze angle, of the echelle grating or at least one parameter of the dispersing element is selected in such a way that the second spectrum is arranged between at least two different diffraction orders of the first spectrum.

15. The spectrometer arrangement of claim 1, wherein the first or the second optical element is arranged at a location in the beam path of the radiation at which the first part of the radiation and the second part of the radiation do not overlap.

* * * * *